(12) United States Patent
Seong

(10) Patent No.: US 11,194,513 B2
(45) Date of Patent: Dec. 7, 2021

(54) STORAGE DEVICE AND OPERATING METHOD THEREOF

(71) Applicant: SK hynix Inc., Gyeonggi-do (KR)

(72) Inventor: Jin Yong Seong, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 60 days.

(21) Appl. No.: 16/515,862

(22) Filed: Jul. 18, 2019

(65) Prior Publication Data

US 2020/0174700 A1 Jun. 4, 2020

(30) Foreign Application Priority Data

Dec. 3, 2018 (KR) .......................... 10-2018-0153558

(51) Int. Cl.
*G06F 3/06* (2006.01)
(52) U.S. Cl.
CPC .......... *G06F 3/0659* (2013.01); *G06F 3/0604* (2013.01); *G06F 3/064* (2013.01); *G06F 3/0673* (2013.01)
(58) Field of Classification Search
CPC ........ G06F 3/061; G06F 3/0604; G06F 13/16; G06F 3/064; G06F 3/0673; G06F 3/0679; G06F 3/0659
See application file for complete search history.

(56) References Cited

U.S. PATENT DOCUMENTS 5,710,881 A * 1/1998 Gupta .................. G06F 12/0804
345/541
9,362,004 B2 * 6/2016 Shim ...................... G11C 29/70
10,127,978 B2 * 11/2018 Oh ....................... G11C 13/0023
2001/0039604 A1 * 11/2001 Takahashi ........... G06F 12/0815
711/141
2003/0115514 A1 * 6/2003 Ilkbahar .............. G06F 11/1028
714/52

(Continued)

FOREIGN PATENT DOCUMENTS

KR 10-2012-0119092 10/2012
KR 10-2017-0084467 7/2017

OTHER PUBLICATIONS

H. Kwon, R. Jin and T. Chung, "AB-FTL: An alternative block Flash Translation Layer using locality-aware technique," IEEE 2nd International Conference on Networked Embedded Systems for Enterprise Applications, Fremantle, WA, 2011, pp. 1-8.*

*Primary Examiner* — Pierre Miche Bataille
(74) *Attorney, Agent, or Firm* — IP & T Group LLP

(57) ABSTRACT

A memory device having an improved booting speed includes: a memory cell array, and a control logic configured to set a memory block as one of a special block for storing special information and a user block for storing user data and configured to store data in a memory block in response to commands from a memory controller, wherein the control logic comprises: a control signal generator configured to generate a special information read signal for reading plural pieces of special information stored in at least two special blocks among the plurality of memory blocks, in response to a special information read command provided by the memory controller, a special information merger configured to read the plural pieces of special information in response to the special information read signal, and a special information storage configured to store the read plural pieces of special information as merged special information.

20 Claims, 14 Drawing Sheets

(56) References Cited

U.S. PATENT DOCUMENTS

| | | | |
|---|---|---|---|
| 2005/0246480 A1* | 11/2005 | Fu | G06F 12/0246 |
| | | | 711/103 |
| 2008/0316819 A1* | 12/2008 | Lee | G11C 16/0483 |
| | | | 365/185.03 |
| 2013/0246480 A1* | 9/2013 | Lemcke | G06Q 10/10 |
| | | | 707/797 |
| 2014/0089574 A1* | 3/2014 | Sohn | G11C 7/1072 |
| | | | 711/105 |
| 2018/0373438 A1* | 12/2018 | Bennett | G06F 3/0652 |

* cited by examiner

STORAGE DEVICE AND OPERATING METHOD THEREOF

CROSS-REFERENCE TO RELATED APPLICATION

The present application claims priority under 35 U.S.C. § 119(a) to Korean patent application number 10-2018-0153558 filed on Dec. 3, 2018, the entire disclosure of which is incorporated herein by reference in its entirety.

BACKGROUND

Field of Invention

The present disclosure generally relates to an electronic device, and more particularly, to a storage device and an operating method therefor.

Description of Related Art

A storage device stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, then stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide a storage device having an improved booting speed and an operating method therefor.

In accordance with an aspect of the present disclosure, there is provided a memory device including: a memory cell array including a plurality of memory blocks, and a control logic configured to set a memory block as one of a special block for storing special information and a user block for storing user data and configured to store data in a memory block in response to commands from a memory controller, wherein the control logic comprises: a control signal generator configured to generate a special information read signal for reading plural pieces of special information stored in at least two special blocks among the plurality of memory blocks, in response to a special information read command provided by the memory controller, a special information merger configured to read the plural pieces of special information in response to the special information read signal, and a special information storage configured to store the read plural pieces of special information as merged special information.

In accordance with another aspect of the present disclosure, there is provided a memory controller for controlling a memory device including a plurality of memory blocks, the memory controller including: a special information read controller configured to generate a special information read command for reading plural pieces of special information stored in at least two special blocks among the plurality of memory blocks and provide the special information read command to the memory device, and a special block setter configured to control the memory device to store merged special information, acquired from the memory device according to the special information read command, in one main block, and control the memory device to set the one main block as a new special block, wherein the plural pieces of special information required to initialize the memory device are stored as the merged special information in a register of the memory device according to the special information read command.

In accordance with still another aspect of the present disclosure, there is provided a method for operating a memory controller for controlling a memory device including a plurality of memory blocks, the method comprising: generating a special information read command for reading plural pieces of special information stored in at least two special blocks among the plurality of memory blocks, providing the special information read command to the memory device, acquiring merged special information from the memory device according to the special information read command, providing the memory device with a program command for storing the merged special information in one main block, and providing the memory device with a special block setting command for setting the one main block as a new special block, wherein the plural pieces of special information required to initialize the memory device are stored as the merged special information in a register of the memory device according to the special information read command.

In accordance with still another aspect of the present disclosure, there is provided a storage device including a memory device including a plurality of memory blocks, and a memory controller configured to provide the memory device with a special information read command for reading plural pieces of special information stored in at least two special blocks among the plurality of memory blocks, and provide the memory device with a program command for storing merged special information acquired from the memory device according to the special information read command, in one main block, wherein the memory device is configured to read data stored in the at least two special blocks and store the plural pieces of special information detected using a multi-bit check scheme among the read data, as the merged special information and provide the merged special information to the memory controller, in response to the special information read command, and wherein the plural pieces of special information are required to initialize the memory device.

In accordance with still another aspect of the present disclosure, there is provided a method for operating a memory device, the method comprising: merging first and second special information respectively stored in first and second special blocks included in the memory device, storing the merged special information in a free main block included in the memory device then setting the free main block as a special block, and erasing the first and second special information from the first and second special blocks then setting the first and second special blocks as main blocks, wherein the first and second special information are stored in the first and second special blocks in different access schemes from each other.

BRIEF DESCRIPTION OF THE DRAWINGS

Example embodiments will now be described more fully hereinafter with reference to the accompanying drawings;

however, the example embodiments may be embodied in different forms and should not be construed as limited to the embodiments set forth herein. Rather, these embodiments are provided so that this disclosure will be thorough and complete, and will fully convey the scope of the example embodiments to those skilled in the art.

Figure 1:
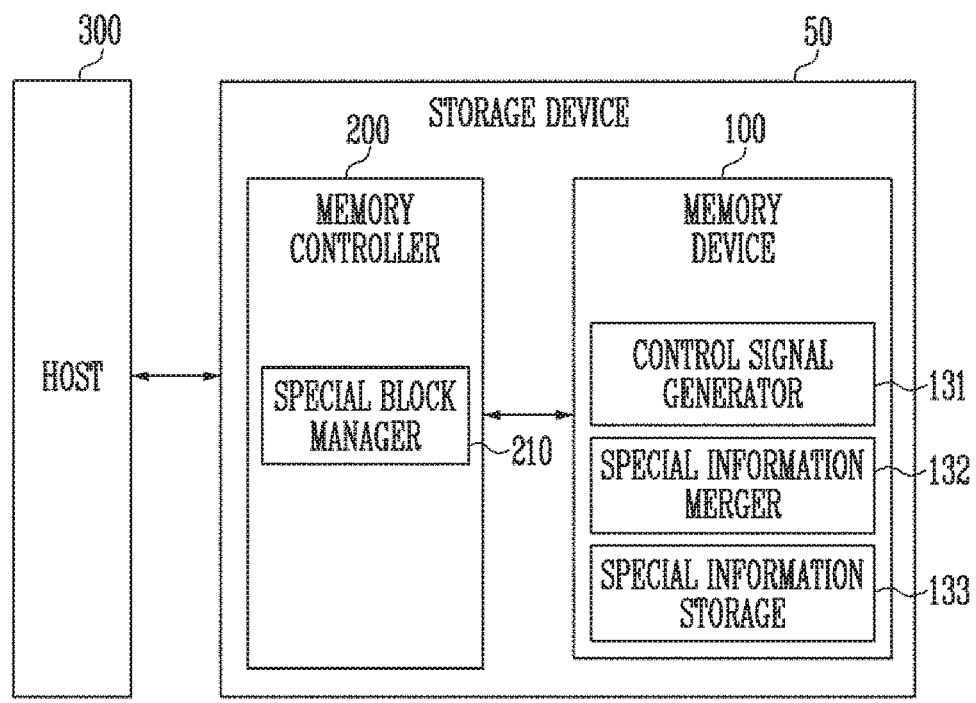

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a diagram illustrating a storage device in accordance with an embodiment of the present disclosure.

Figure 2:
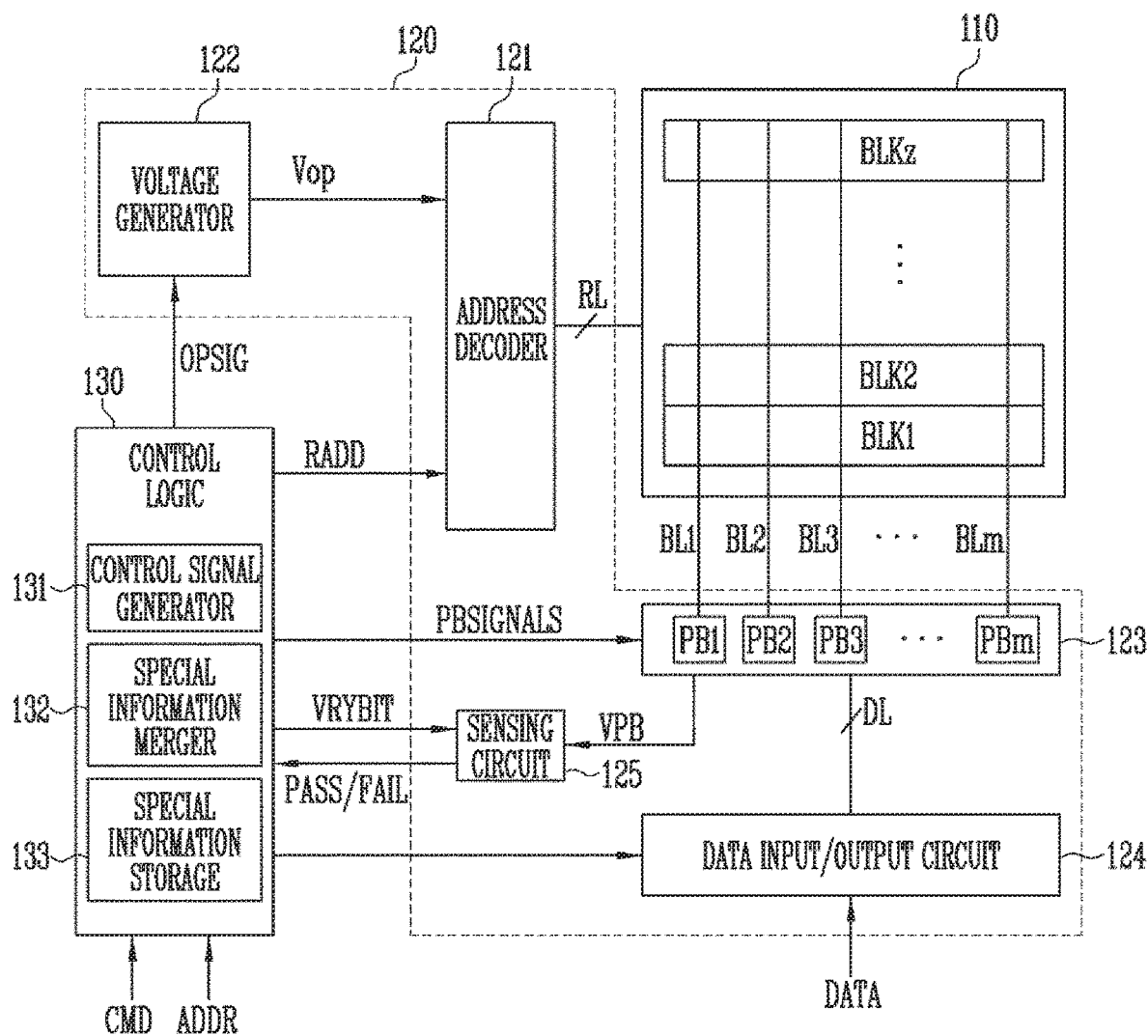

FIG. 2 is a diagram illustrating a structure of a memory device shown in FIG. 1.

Figure 3:
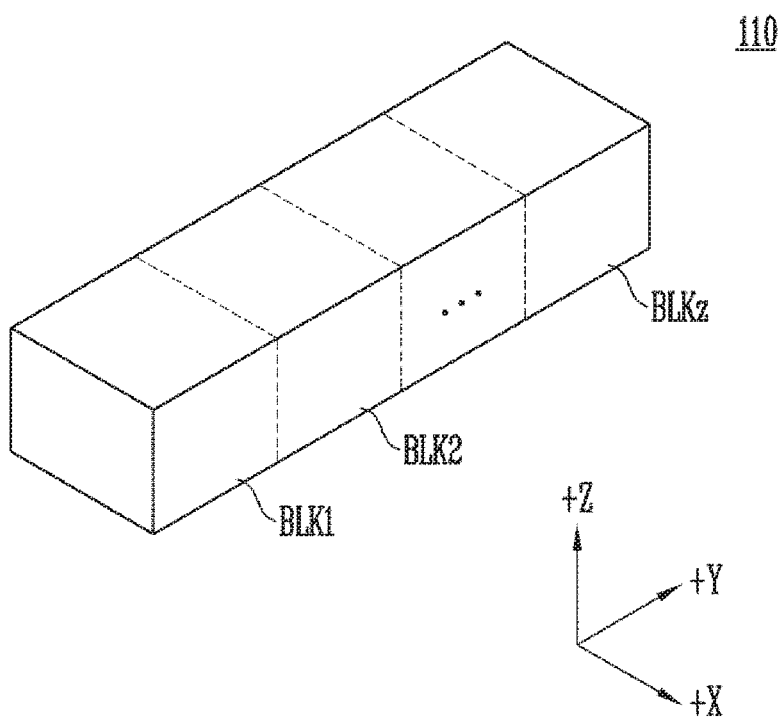

FIG. 3 is a diagram illustrating an embodiment of a memory cell array shown in FIG. 2.

Figure 4:
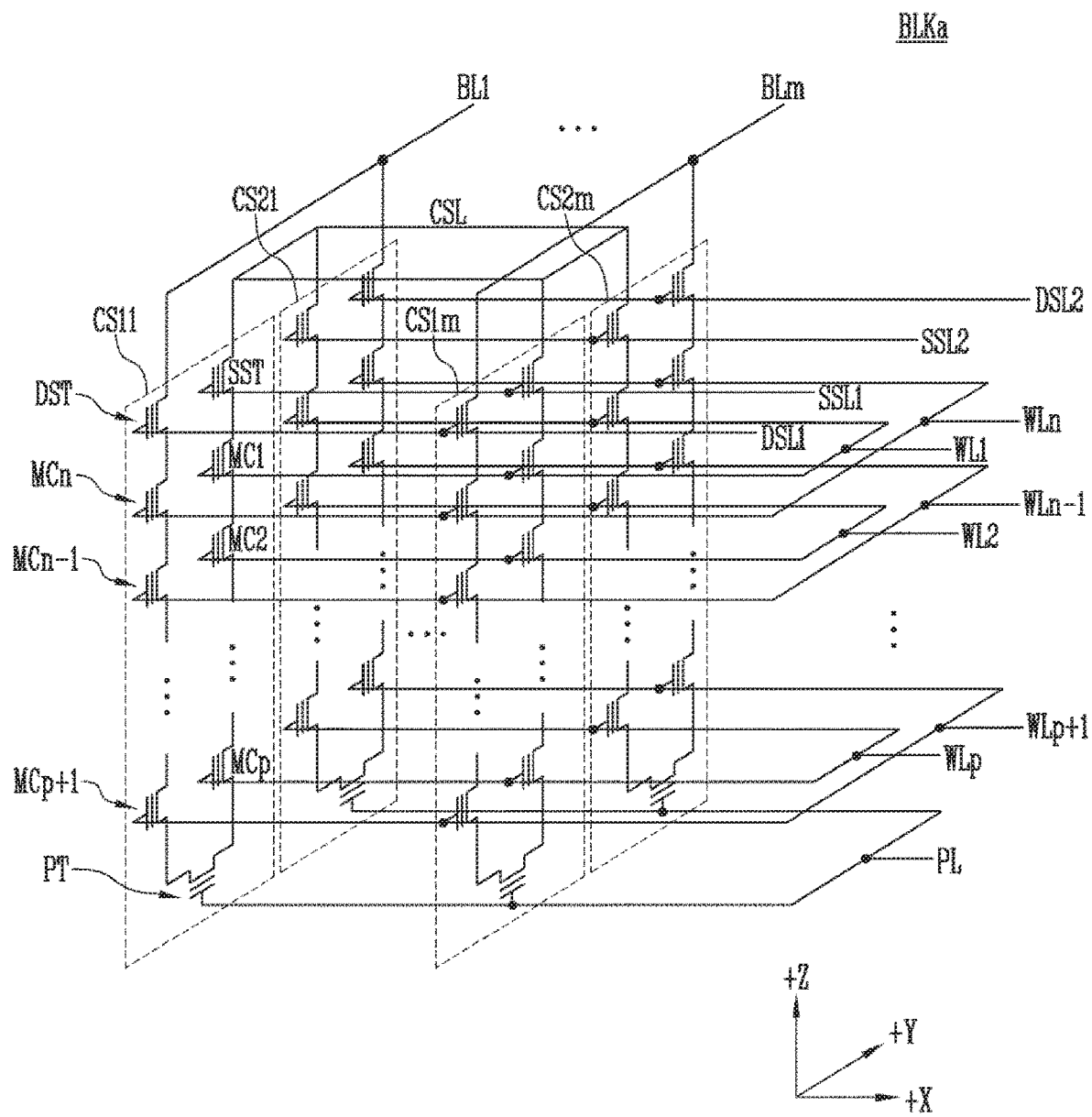

FIG. 4 is a circuit diagram illustrating any one memory block among memory blocks shown in FIG. 3.

Figure 5:
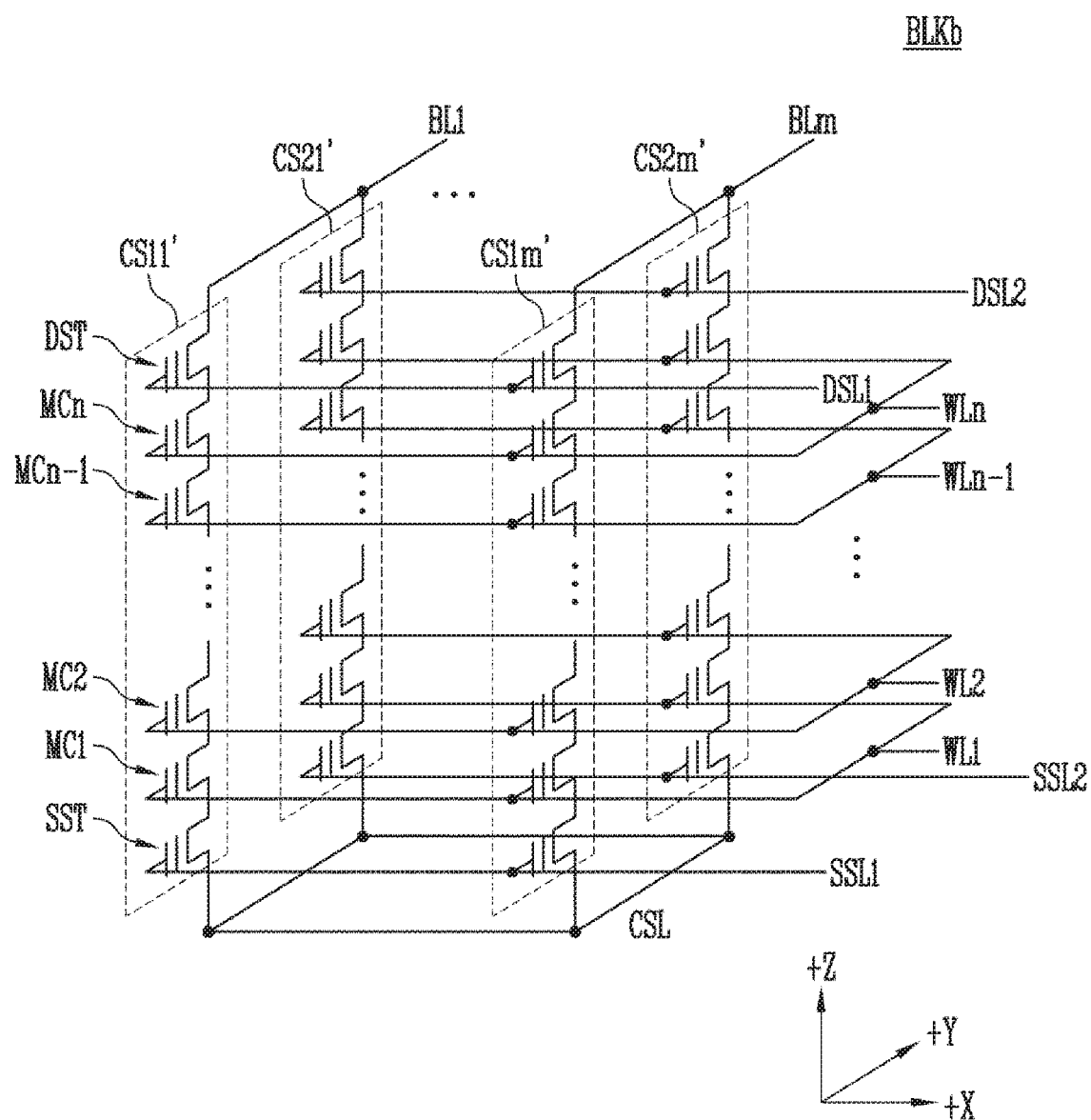

FIG. 5 is a circuit diagram illustrating another embodiment of the one memory block among the memory blocks shown in FIG. 3.

Figure 6:
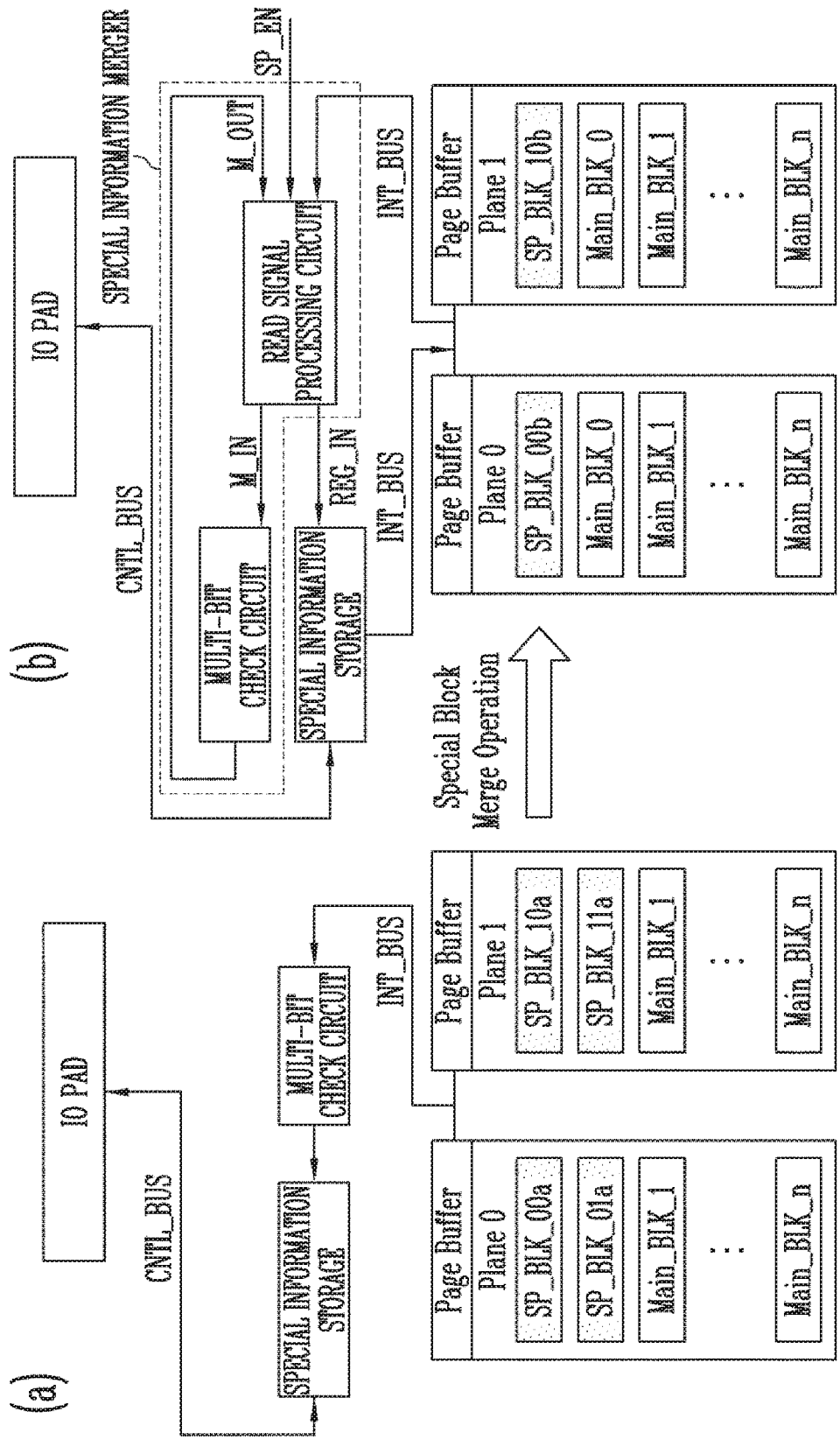

FIG. 6 is a diagram illustrating a structure and operation of the memory device in accordance with an embodiment of the present disclosure.

Figure 7:
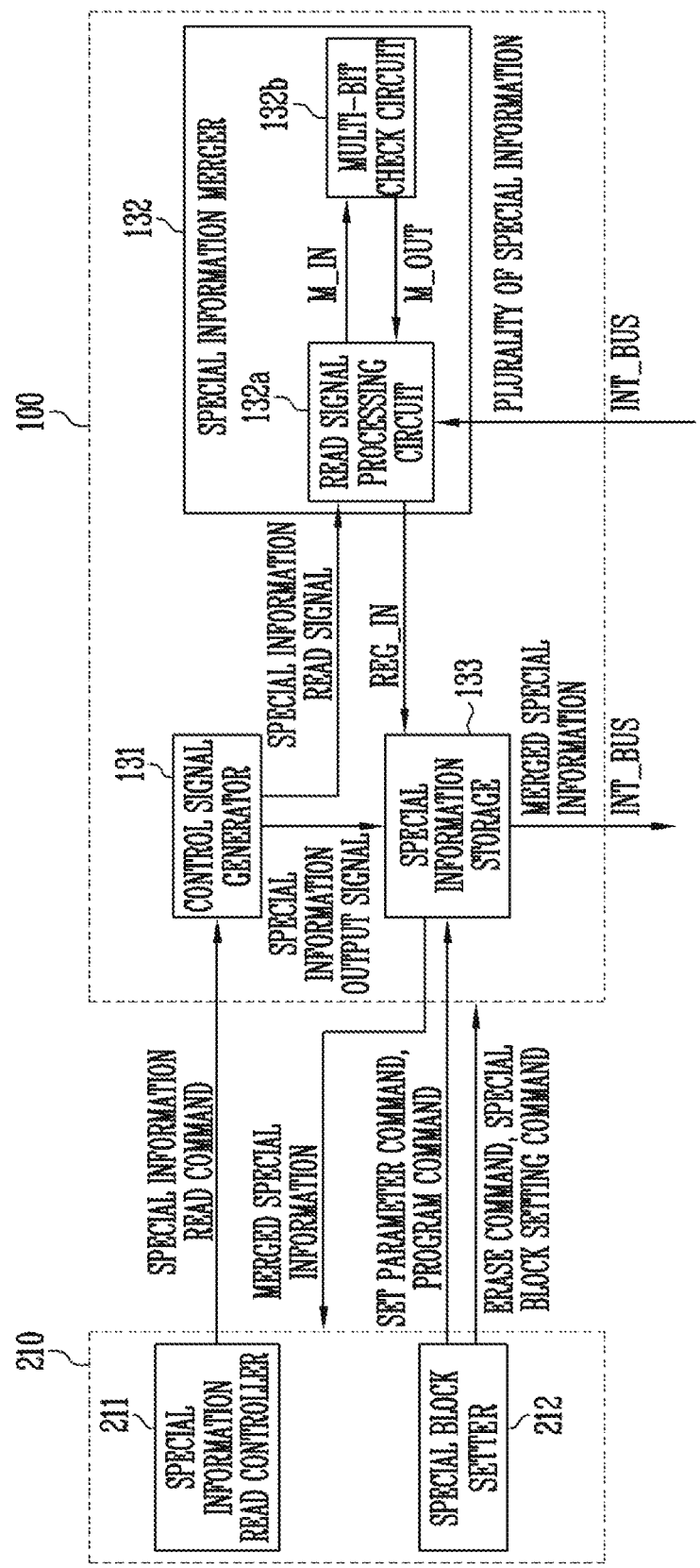

FIG. 7 is a circuit diagram illustrating operations of a memory controller and the memory device in accordance with an embodiment of the present disclosure.

Figure 8:
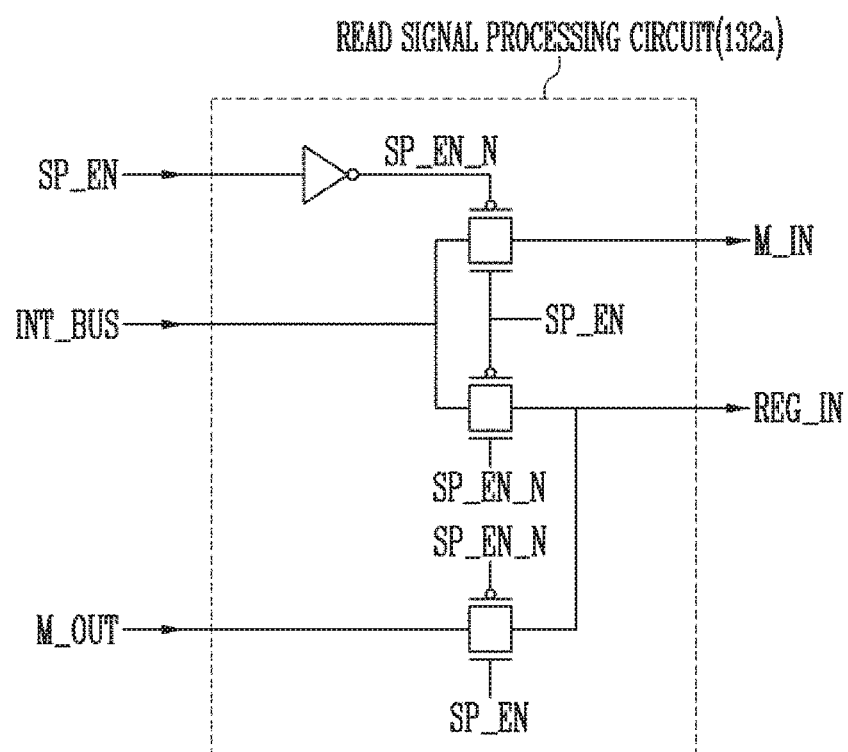

FIG. 8 is a diagram illustrating a read signal processing circuit shown in FIG. 7.

Figure 9:
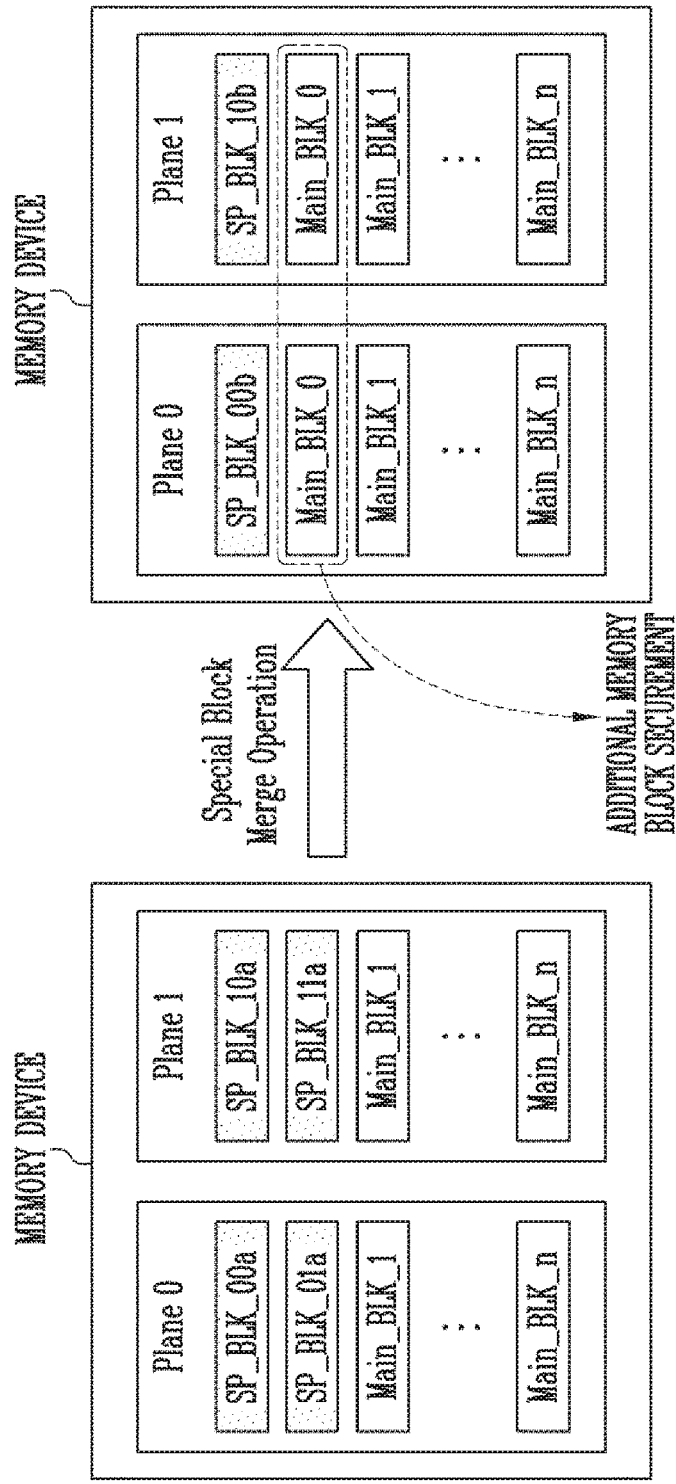

FIG. 9 is a diagram illustrating a special block merge operation.

Figure 10:
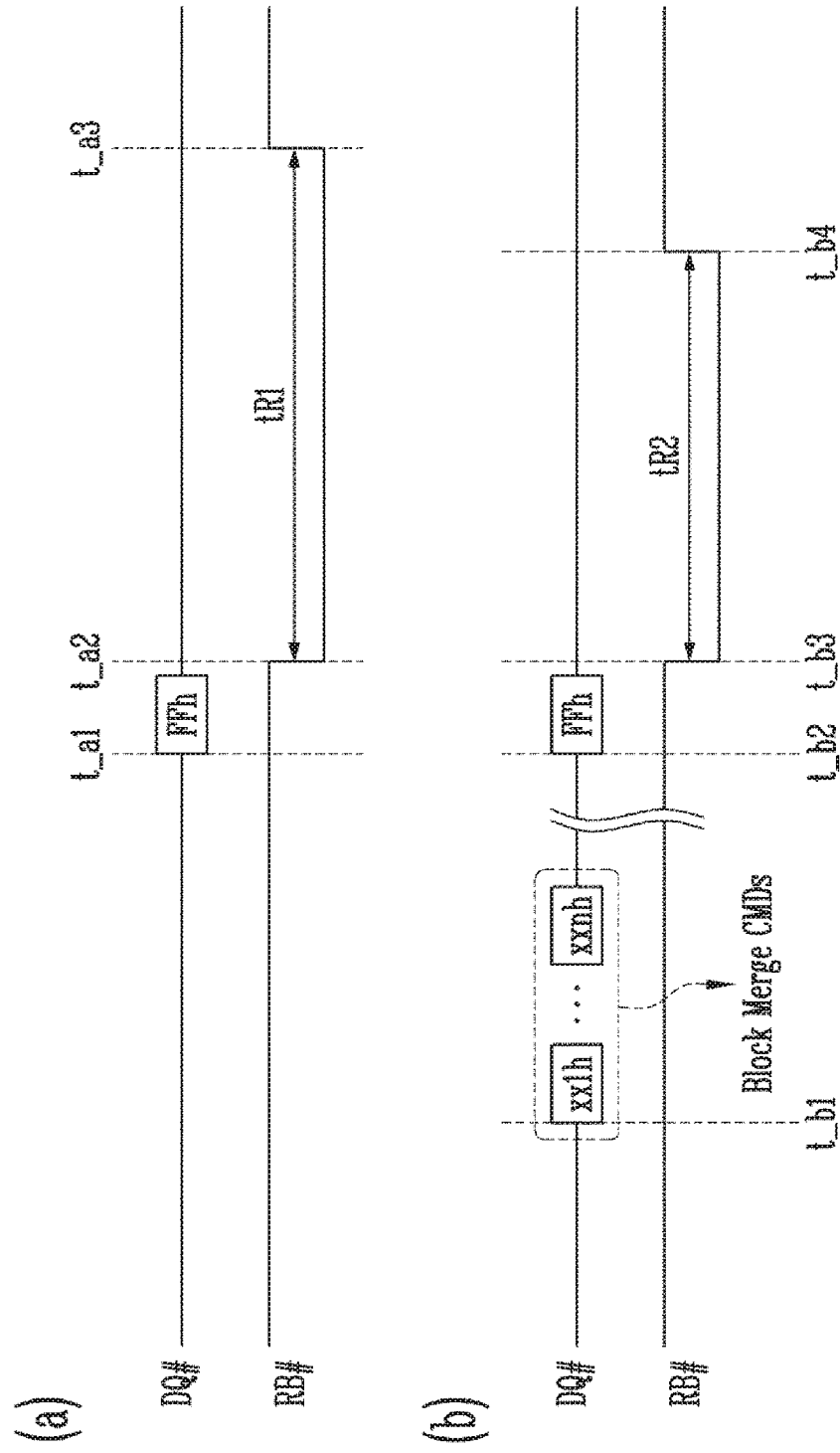

FIG. 10 is a diagram illustrating booting operations of the memory device before and after special block merge.

Figure 11:
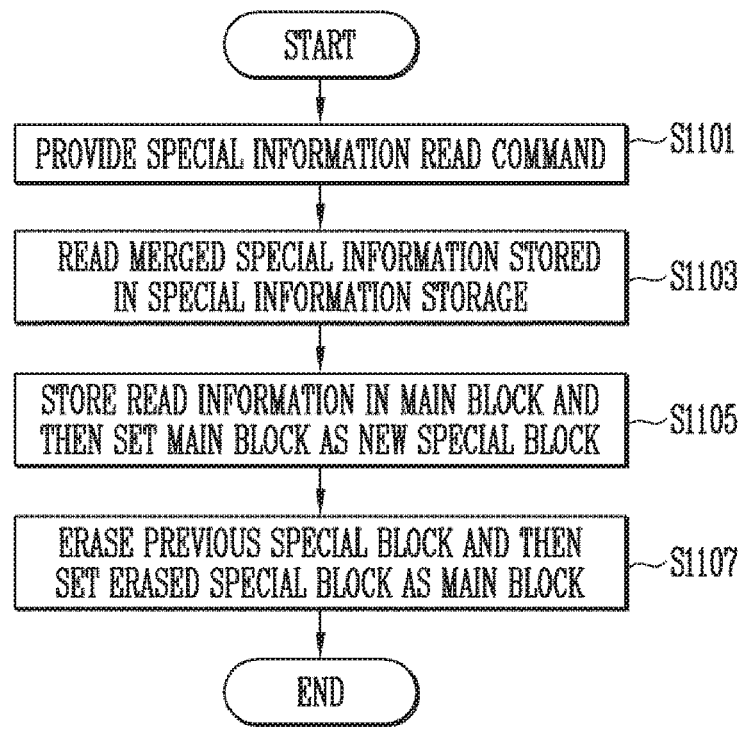

FIG. 11 is a flowchart illustrating an operation of the memory controller.

Figure 12:
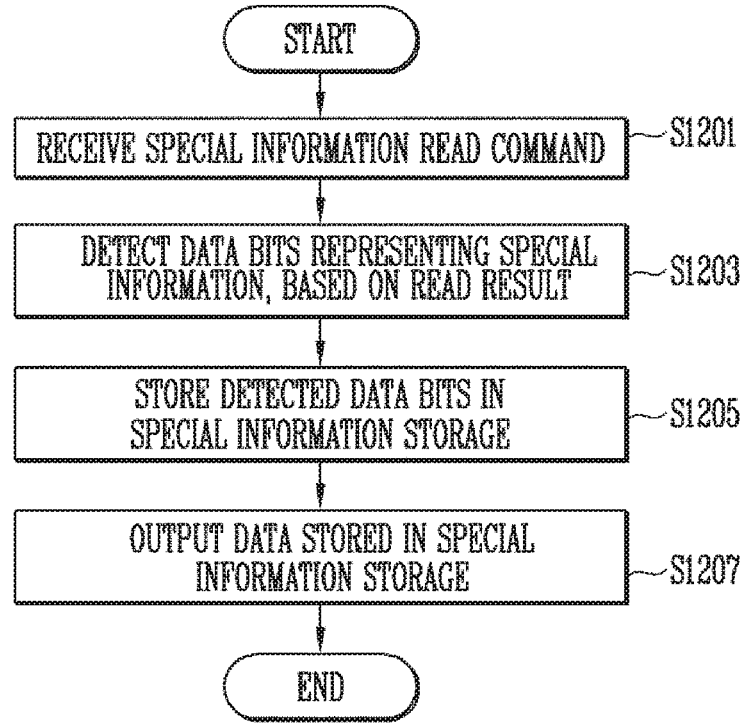

FIG. 12 is a flowchart illustrating an operation of the memory device.

Figure 13:
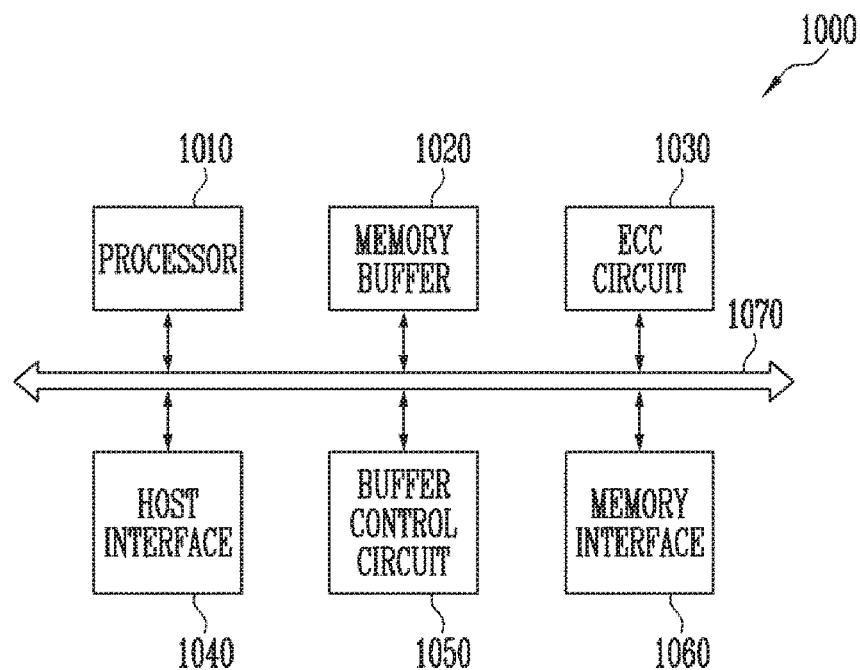

FIG. 13 is a diagram illustrating another embodiment of the memory controller shown in FIG. 1.

Figure 14:
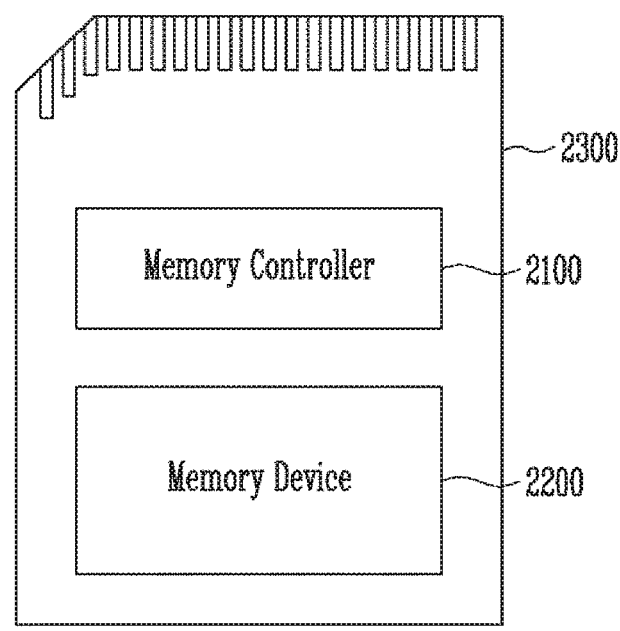

FIG. 14 is a block diagram illustrating a memory card system to which the storage device is applied in accordance with an embodiment of the present disclosure.

Figure 15:
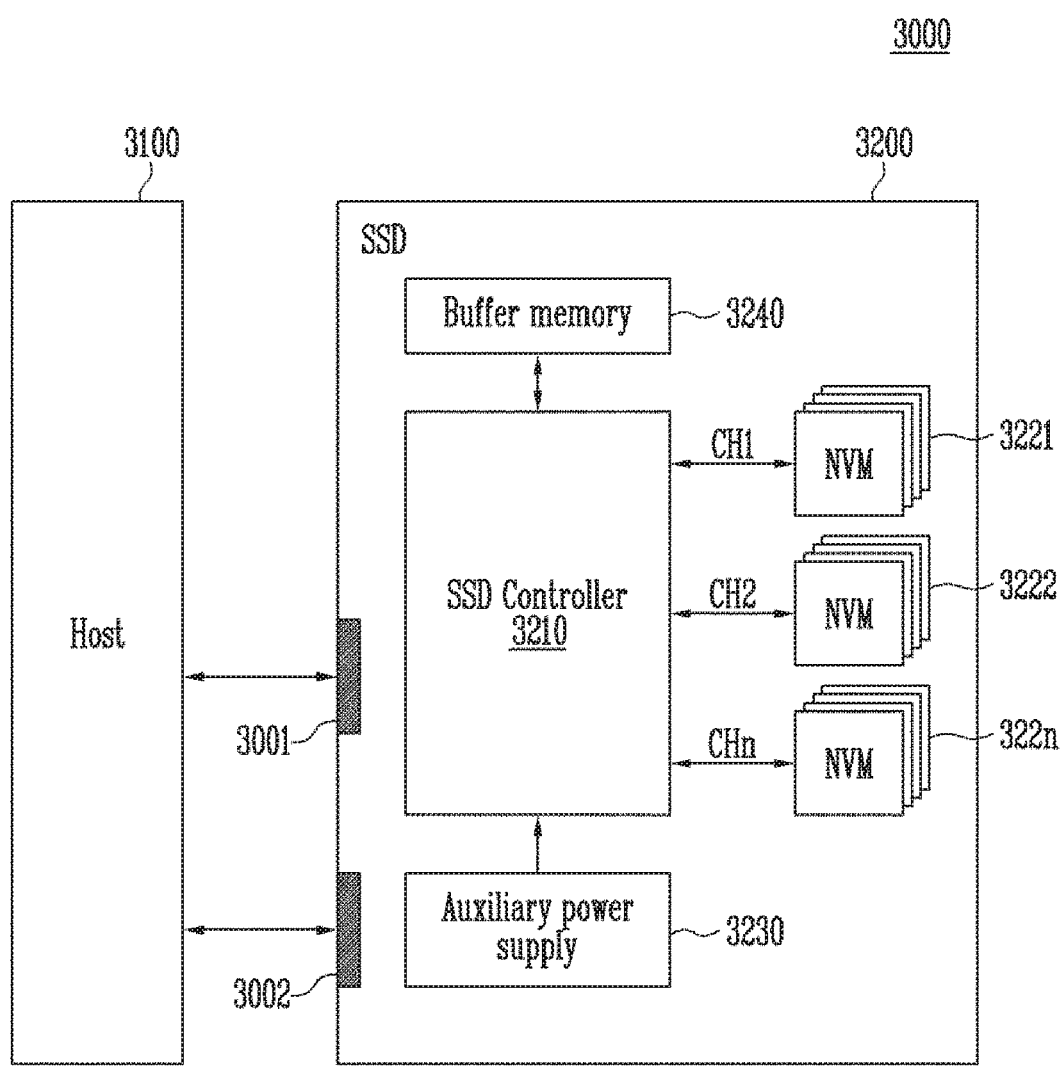

FIG. 15 is a block diagram exemplarily illustrating a Solid State Drive (SSD) system to which the storage device is applied in accordance with an embodiment of the present disclosure.

Figure 16:
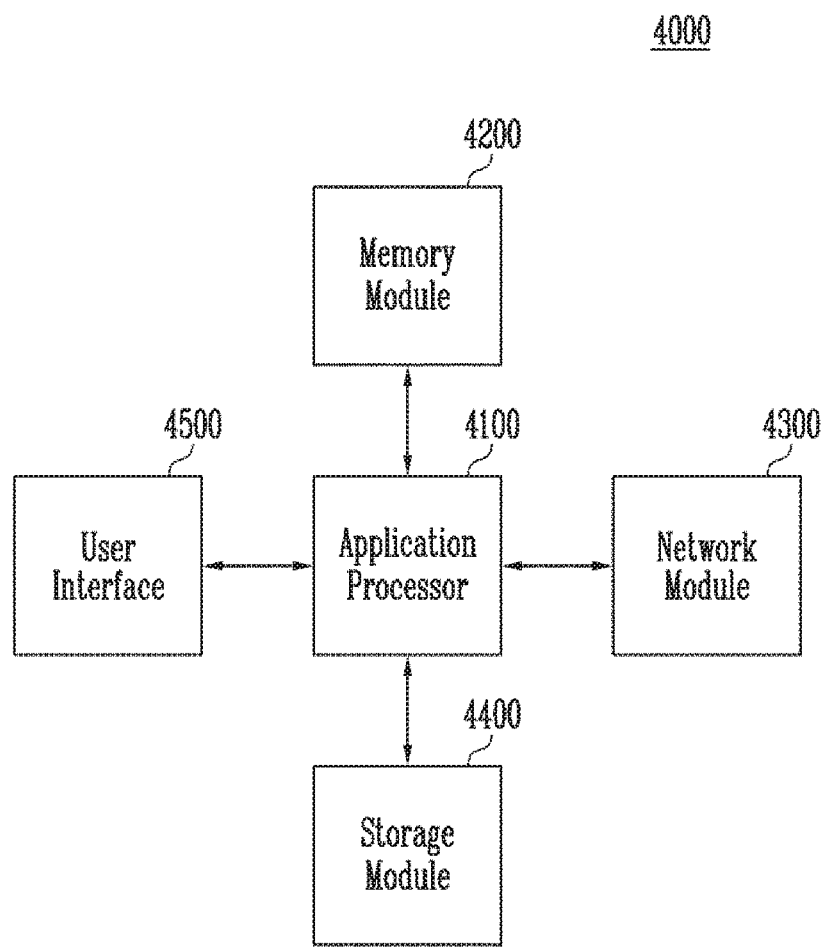

FIG. 16 is a block diagram illustrating a user system to which the storage device is applied in accordance with an embodiment of the present disclosure.

DETAILED DESCRIPTION

The specific structural or functional description disclosed herein is merely illustrative for the purpose of describing embodiments in accordance with the concept of the present disclosure. The embodiments in accordance with the concept of the present disclosure can be implemented in various forms, and cannot be construed as limited to the embodiments set forth herein.

The embodiments in accordance with the concept of the present disclosure can be variously modified and have various shapes. Thus, the embodiments are illustrated in the drawings and are intended to be described herein in detail. However, the embodiments in accordance with the concept of the present disclosure are not construed as limited to specified disclosures, and include all changes, equivalents, or substitutes that do not depart from the spirit and technical scope of the present disclosure.

While terms such as "first" and "second" may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present. Meanwhile, other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

So far as not being differently defined, all terms used herein including technical or scientific terminologies have meanings that are commonly understood by those skilled in the art to which the present disclosure pertains. The terms having the definitions as defined in the dictionary should be understood such that the terms have meanings consistent with the context of the related technique. So far as not being clearly defined in this application, terms should not be understood in an ideally or excessively formal way.

In describing those embodiments, description will be omitted for techniques that are well known to the art to which the present disclosure pertains, and are not directly related to the present disclosure. This intends to disclose the gist of the present disclosure more clearly by omitting unnecessary description.

Hereinafter, exemplary embodiments of the present disclosure will be described in detail with reference to the accompanying drawings in order for those skilled in the art to be able to readily implement the technical spirit of the present disclosure.

FIG. 1 is a diagram illustrating a storage device 50 in accordance with an embodiment of the present disclosure.

Referring to FIG. 1, the storage device 50 may include a memory device 100 and a memory controller 200 for controlling an operation of the memory device 100.

The storage device 50 may be a device for storing data under the control of a host 300, such as a mobile phone, a smart phone, an MP3 player, a laptop computer, a desktop computer, a game console, a TV, a tablet PC or an in-vehicle infotainment.

The storage device 50 may be manufactured as any one of various types of storage devices according to a host interface that is a communication scheme with the host 300. For example, the storage device 50 may be implemented with any one of various types of storage devices such as a Solid State Drive (SSD), a Multi-Media Card (MMC), an embedded, Multi-Media Card (eMMC), a Reduced Size, Multi-Media Card (RS-MMC), and a micro-Multi-Media Card (micro-MMC) type, a Secure Digital (SD) card of a Secure Digital (SD), a mini-Secure Digital (mini-SD) and a micro-Secure Digital (micro-SD) type, an Universal Storage Bus (USB) storage device, a Universal Flash Storage (UFS) device, a storage device of a Personal Computer Memory Card International Association (PCMCIA) card type, a storage device of a Peripheral Component Interconnection (PCI) card type, a storage device of a PCI-Express (PCI-e or PCIe) card type, a Compact Flash (CF) card, a smart media card, and a memory stick.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

The memory device 100 receives a command and an address from the memory controller 200 and accesses an area selected by the address in the memory cell array. That is, the memory device 100 may perform an operation corresponding to the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

In an embodiment, the memory device 100 may include a control signal generator 131, a special information merger 132, and a special information storage 133. In an embodiment, the memory device 100 may further include one or more special blocks and one or more main blocks, which will be described with reference to FIG. 6.

The control signal generator 131 may generate a special information read signal and provide the generated special information read signal to the special information merger 132, in response to a special information read command provided by the memory controller 200.

The control signal generator 131 may generate a special information output signal and provide the generated special information output signal to the special information storage 133, in response to the special information read command. The special information read command may be a command for requesting data stored in the special information storage 133 to be provided to the memory controller 200.

A special block within the memory device 100 may be a memory block for storing special information that is information required to initialize the memory device 100. For example, the special information may include at least one of bad block information, column repair information, and logic information. The bad block information may represent initial bad memory blocks among the plurality of memory blocks included in the memory device 100. The column repair information may represent a bad column of the memory cell array. The logic information may represent a program bias, a read bias, an erase bias, and the like as conditions necessary for an operation of the memory device 100.

The special information merger 132 may sequentially read data stored in at least two special blocks in response to the special information read signal received from the control signal generator 131. Specifically, the special information merger 132 may read data bits stored in any one special block among the at least two special blocks in response to the special information read signal. The special information merger 132 may detect data bits representing special information among the data bits read from the one special block, using a multi-bit check scheme. Each of the data bits representing the special information may be repeatedly stored a preset number of times in the one special block. The multi-bit check scheme may be a scheme that reads the data bits from the one special block and detects, as the data bits representing special information, the same data pattern repeated a reference number of times, from the read result. The special information merger 132 may store the data bits representing special information detected from the at least two special blocks in the special information storage 133. As the result, data bits representing merged special information may be stored in the special information storage 133.

The special information storage 133 may include a latch circuit for storing the data bits representing special information. In an embodiment, the special information storage 133 may store the data bits representing the special information, which are detected by the special information merger 132, using the multi-bit check scheme. The special information storage 133 may provide the stored data bits representing special information to the memory controller 200 in response to the special information output signal.

The memory controller 200 may control overall operations of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data regardless of a request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the memory devices according to an interleaving scheme so as to improve operational performance. The interleaving scheme may be an operating scheme that allows operating sections of at least two memory devices 100 to overlap with each other.

In an embodiment, the memory controller 200 may include a special block manager 210.

The special block manager 210 may provide a special information read command to the control signal generator 131. The special information read command may be a command for requesting data stored in the special information storage 133 to be provided to the special block manager 210.

The data stored in the special information storage 133 may be data obtained by reading data stored in at least two special blocks and merging data representing special information detected using the multi-bit check scheme among the read data. In an embodiment, the special block manager 210 may acquire special information obtained by merging special information stored in the at least two special blocks, which are read by the memory device 100, in response to the special information read command. Specifically, the special block manager 210 may provide the special information read command to the memory device 100, and the memory device 100 may provide special information stored in the special information storage 133 to the memory controller 200 in response to the special information read command.

The special block manager 210 may provide the memory device 100 with a program command for storing the merged special information in one main block. The one main block may be a memory block configured to store user data.

The special block manager 210 may provide the memory device 100 with an erase command for erasing the at least two special blocks, data in which are read in response to the special information read command.

The special block manager 210 may set, as a new special block, the one main block in which the merged special information is stored. The special block manager 210 may set the erased special blocks as main blocks. Specifically, the special block manager 210 may provide the memory device 100 with a special block setting command for setting a memory block as a special block or setting the special block as a main block.

The special block manager 210 may provide block merge commands to the memory device 100 so as to merge special information stored in special blocks and store the merged special information in one special block. The block merge commands may include a special information read command, a program command, an erase command, a special block setting command, and the like.

In an embodiment, the block merge commands may include a set parameter command for changing values of merged special information stored in the special information storage 133. Therefore, the special block manager 210 may change the values of the merged special information stored in the special information storage 133, using the set parameter command. The special block manager 210 may store, in one main block, the changed special information stored in the special information storage 133, using the block merge commands, and set the one main block as a special block.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

FIG. 2 is a diagram illustrating a structure of the memory device shown in FIG. 1.

Referring to FIG. 2, the memory device 100 may include a memory cell array 100, a peripheral circuit 120, and a control logic 130.

The memory cell array 110 includes a plurality of memory blocks BLK1 to BLKz. The plurality of memory blocks BLK1 to BLKz are coupled to an address decoder 121 through row lines RL. The plurality of memory blocks BLK1 to BLKz are coupled to a read/write circuit 123 through bit lines BL1 to BLm. Each of the plurality of memory blocks BLK1 to BLKz includes a plurality of memory cells.

In an embodiment, the plurality of memory cells may be nonvolatile memory cells. Among the plurality of memory cells, memory cells coupled to the same word line may be defined as one page. That is, the memory cell array 110 may include a plurality of pages. In accordance with an embodiment of the present disclosure, each of the plurality of memory blocks BLK1 to BLKz included in the memory cell array 110 may include a plurality of dummy cells. One or more dummy cells may be coupled in series between a drain select transistor and memory cells, and between a source select transistor and the memory cells.

Each of the memory cells of the memory device 100 may be a single level cell (SLC) for storing one data bit, a multi-level cell (MLC) for storing two data bits, a triple level cell (TLC) for storing three data bits, or a quad level cell (QLC) for storing four data bits.

The peripheral circuit 120 may include the address decoder 121, a voltage generator 122, the read/write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is coupled to the memory cell array 110 through the row lines RL. The row lines RL may include drain select lines, word lines, source select lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may operate under the control of the control logic 130. The address decoder 121 receives an address ADDR from the control logic 130.

The address decoder 121 may decode a block address in the received address ADDR. The address decoder 121 selects at least one memory block among the memory blocks BLK1 to BLKz according to the decoded block address. The address decoder 121 may decode a row address RADD in the received address ADDR. The address decoder 121 may select at least one word line WL of the selected memory block by applying voltages provided from the voltage generator 122 to the word line WL according to the decoded row address RADD.

In a program operation, the address decoder 121 may apply a program voltage to the selected word line, and apply a pass voltage having a level lower than that of the program voltage to unselected word lines. In a program verify operation, the address decoder 121 may apply a verify voltage to the selected word line, and apply a verify pass voltage having a level higher than that of the verify voltage to the unselected word lines.

In a read operation, the address decoder 121 may apply a read voltage to the selected word line, and apply a read pass voltage having a level higher than that of the read voltage to the unselected word lines.

In accordance with an embodiment of the present disclosure, an erase operation of the memory device 100 is performed in units of memory blocks. In an erase operation, the address ADDR input to the memory device 100 includes a block address. The address decoder 121 may decode the block address and select one memory block according to the decoded block address. In the erase operation, the address decoder 121 may apply a ground voltage to word lines coupled to the selected memory block.

In accordance with an embodiment of the present disclosure, the address decoder 121 may decode a column address in the address ADDR transmitted thereto. The decoded column address may be transmitted to the read/write circuit 123. In an example, the address decoder 121 may include components such as a row decoder, a column decoder, and an address buffer.

The voltage generator 122 may generate a plurality of voltages by using an external power voltage supplied to the memory device 100. The voltage generator 122 operates under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of operating voltages Vop by using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of select read voltages, and a plurality of unselect read voltages.

In order to generate a plurality of operating voltages Vop having various voltage levels, the voltage generator 122 may include a plurality of pumping capacitors for receiving the internal power voltage, and generate the plurality of operating voltages Vop by selectively activating the plurality of pumping capacitors under the control of the control logic 130.

The plurality of generated voltages Vop may be supplied to the memory cell array 110 by the address decoder 121.

The read/write circuit 123 includes first to mth page buffers PB1 to PBm. The first to mth page buffers PB1 to PBm are coupled to the memory cell array 110 through the respective first to mth bit lines BL1 to BLm. The first to mth page buffers PB1 to PBm operate under the control of the control logic 130.

The first to mth page buffers PB1 to PBm communicate data DATA with the data input/output circuit 124. In a program operation, the first to mth page buffers PB1 to PBm receive data DATA to be stored through the data input/output circuit 124 and data lines DL.

In a program operation, the first to mth page buffers PB1 to PBm may transfer, to selected memory cells through the bit lines BL1 to BLm, data DATA received through the data input/output circuit 124 when a program pulse is applied to a selected word line. The memory cells of the selected memory cells are programmed according to the transferred data DATA. A memory cell coupled to a bit line through which a program allow voltage (e.g., a ground voltage) is applied may have an increased threshold voltage. A threshold voltage of a memory cell coupled to a bit line through which a program inhibit voltage (e.g., a power voltage) is applied may be maintained. In a program verify operation, the first to mth page buffers PB1 to PBm read data DATA stored in the selected memory cells from the selected memory cells through the bit lines BL1 to BLm.

In a read operation, the read/write circuit 123 may read data DATA from memory cells of a selected page through the bit lines BL, and store the read data DATA in the first to mth page buffers PB1 to PBm.

In an erase operation, the read/write circuit 123 may float the bit lines BL. In an embodiment, the read/write circuit 123 may include a column select circuit.

The data input/output circuit 124 is coupled to the first to mth page buffers PB1 to PBm through the data lines DL. The data input/output circuit 124 operates under the control of the control logic 130.

The data input/output circuit 124 may include a plurality of input/output buffers (not shown) that receive input data DATA. In a program operation, the data input/output circuit 124 may receive data DATA to be stored from an external controller (not shown). In a read operation, the data input/output circuit 124 outputs, to the external controller, data transmitted from the first to mth page buffers PB1 to PBm included in the read/write circuit 123.

In a read operation or verify operation, the sensing circuit 125 may generate a reference current in response to an allow bit VRYBIT signal generated by the control logic 130, and output a pass signal or fail signal to the control logic 130 by comparing a sensing voltage VPB received from the read/write circuit 123 and a reference voltage generated by the reference current.

The control logic 130 may be coupled to the address decoder 121, the voltage generator 122, the read/write circuit 123, the data input/output circuit 124, and the sensing circuit 125. The control logic 130 may control overall operations of the memory device 100. The control logic 130 may operate in response to a command CMD transferred from an external device.

The control logic 130 may control the peripheral circuit 120 by generating several signals in response to a command CMD and an address ADDR. For example, the control logic 130 may generate an operation signal OPSIG, a row address RADD, a read/write circuit control signal PBSIGNALS, and an allow bit VRYBIT in response to the command CMD and the address ADDR. The control logic 130 may output the operation signal OPSIG to the voltage generator 122, output the row address RADD to the address decoder 121, output the read/write circuit control signal PBSIGNALS to the read/write circuit 123, and output the allow bit VRYBIT to the sensing circuit 125. Also, the control logic 130 may determine whether the verify operation has passed or failed in response to the pass or fail signal PASS/FAIL output by the sensing circuit 125.

In an embodiment, the control logic 130 may include the control signal generator 131, the special information merger 132, and the special information storage 133.

The control signal generator 131 may generate the special information read signal and provide the generated special information read signal to the special information merger 132, in response to a special information read command provided by the memory controller 200. The special information read signal may be a signal for reading plural pieces of special information stored in at least two special blocks and requesting special information detected using a multi-bit check scheme among read data to be provided to the special information storage 133. The control signal generator 131 may generate the special information output signal and provide the generated special information output signal to the special information storage 133. The special information output signal may be a signal for requesting data stored in the special information storage 133 to be provided to the memory controller 200.

The special information merger 132 may sequentially read data stored in at least two special blocks among the plurality of memory blocks included in the memory cell array 110 in response to the special information read signal. Specifically, the special information merger 132 may sequentially receive, from the read/write circuit 123, results obtained by reading data bits stored in any one special block among the at least two special blocks.

The special information merger 132 may detect data bits representing special information, using the multi-bit check scheme, from the read result. Each of the data bits representing the special information may be repeatedly stored a preset number of times in the one special block. The multi-bit check scheme may be a scheme that reads the data bits from the one special block and detects, as the data bits representing special information, the same data pattern repeated a reference number of times, from the read result.

The special information storage 133 may store the data bits representing the special information, which are detected by the special information merger 132, using the multi-bit check scheme. The special information storage 133 may provide data stored therein to the memory controller 200 in response to the special information output signal received from the control signal generator 131. The data stored in the special information storage 133 may be data obtained by merging data representing special information detected using the multi-bit check scheme among data read from the at least two special blocks.

FIG. 3 is a diagram illustrating an embodiment of the memory cell array shown in FIG. 2.

Referring to FIG. 3, the memory cell array 110 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions. A structure of each memory block will be described in more detail with reference to FIGS. 4 and 5.

FIG. 4 is a circuit diagram illustrating any one memory block BLKa among the memory blocks BLK1 to BLKz shown in FIG. 3.

Referring to FIG. 4, the memory block BLKa may include a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (i.e., a +X direction). FIG. 4 illustrates two cell strings arranged in a column direction (i.e., a +Y direction). However, this is for convenience of description, and it will be understood that three cell strings may be arranged in the column direction.

Each of the plurality of cell strings CS11 to CS1$m$ and CS21 to CS2$m$ may include at least one source select transistor SST, first to nth memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. In FIG. 4, the source select transistors of the cell strings CS11 to CS1$m$ on a first row are coupled to a first source select line SSL1. The source select transistors of the cell strings CS21 to CS2$m$ on a second row are coupled to a second source select line SSL2.

In another embodiment, the source select transistors of the cell strings CS11 to CS1$m$ and CS21 to CS2$m$ may be commonly coupled to one source select line.

The first to nth memory cells MC1 to MCn of each cell string are coupled between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction, and are coupled in series between the source select transistor SST and the pipe transistor PT. The (p+1)th to nth memory cells MCp+1 to MCn are sequentially arranged in the +Z direction, and are coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1$m$ on the first row are coupled to a first drain select line DSL1. The drain select transistors of the cell strings CS21 to CS2$m$ on the second row are coupled to a second drain select line DSL2.

Cell strings arranged in the column direction are coupled to a bit line extending in the column direction. In FIG. 4, the cell strings CS11 and CS21 on a first column are coupled to a first bit line BL1. The cell strings CS1$m$ and CS2$m$ on an mth column are coupled to an mth bit line BL$m$.

Memory cells coupled to the same word line in the cell strings arranged in the row direction constitute one page. For example, memory cells coupled to the first word line WL1 in the cell strings CS11 to CS1$m$ on the first row constitute one page. Memory cells coupled to the first word line WL1 in the cell strings CS21 to CS2$m$ on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to mth bit lines BL1 to BL$m$. In addition, even-numbered cell strings among the cell strings CS11 to CS1$m$ or CS21 to CS2$m$ arranged in the row direction may be coupled to the even bit lines, respectively, and odd-numbered cell strings among the cell strings CS11 to CS1$m$ or CS21 to CS2$m$ arranged in the row direction may be coupled to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn. When the number of dummy memory cells increases, the reliability of an operation of the memory block BLKa is improved. On the other hand, the size of the memory block BLKa increases. When the number of dummy memory cells decreases, the size of the memory block BLKa decreases. On the other hand, the reliability of an operation of the memory block BLKa may be deteriorated.

In order to efficiently control the at least one dummy memory cell, the dummy memory cells may have a required threshold voltage. Before or after an erase operation of the memory block BLKa, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

FIG. 5 is a circuit diagram illustrating another embodiment BLKb of the one memory block among the memory blocks BLK1 to BLKz shown in FIG. 3.

Referring to FIG. 5, the memory block BLKb may include a plurality of cell strings CS11' to CS1$m$' and CS21' to CS2$m$'. Each of the plurality of cell strings CS11' to CS1$m$' and CS21' to CS2$m$' extends along the +Z direction. Each of the plurality of cell strings CS11' to CS1$m$' and CS21' to CS2$m$' includes at least one source select transistor SST, first to nth memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1$m$' arranged on a first row are coupled to a first source select line SSL1. Source select transistors of the cell strings CS21' to CS2$m$' arranged on a second row are coupled to a second source select line SSL2. In another embodiment, the source select transistors of the cell strings CS11' to CS1$m$' and CS21' to CS2$m$' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1$m$' on the first row are coupled to a first drain select line DSL1. The drain select transistors of the cell strings CS21' to CS2$m$' on the second row are coupled to a second drain select line DSL2.

Consequently, the memory block BLKb of FIG. 5 has a circuit similar to that of the memory block BLKa of FIG. 4, except that the pipe transistor PT is excluded from each cell string in FIG. 5.

In another embodiment, even bit lines and odd bit lines may be provided instead of the first to mth bit lines BL1 to BL$m$. In addition, even-numbered cell strings among the cell strings CS11' to CS1$m$' or CS21' to CS2$m$' arranged in the row direction may be coupled to the even bit lines, respectively, and odd-numbered cell strings among the cell strings CS11' to CS1$m$' or CS21' to CS2$m$' arranged in the row direction may be coupled to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn. When the number of dummy memory cells increases, the reliability of an operation of the memory block BLKb is improved. On the other hand, the size of the memory block BLKb is increased. When the number of dummy memory cells decreases, the size of the memory block BLKb decreases. On the other hand, the reliability of an operation of the memory block BLKb may be deteriorated.

In order to efficiently control the at least one dummy memory cell, the dummy memory cells may have a required threshold voltage. Before or after an erase operation of the memory block BLKb, a program operation may be performed on all or some of the dummy memory cells. When an erase operation is performed after the program operation is performed, the threshold voltage of the dummy memory cells controls a voltage applied to the dummy word lines coupled to the respective dummy memory cells, so that the dummy memory cells can have the required threshold voltage.

FIG. 6 is a diagram illustrating a structure and operation of the memory device 100 described with reference to FIG. 2 in accordance with an embodiment of the present disclosure.

Referring to a block diagram (a) in FIG. 6, a memory device 100 may perform an operation of reading special information stored in special blocks.

The memory device 100 may include a zeroth plane Plane 0 and a first plane Plane 1. The zeroth plane Plane 0 may include zeroth and first special blocks SP_BLK_00a and SP_BLK_01a. The first plane Plane 1 may include zeroth and first special blocks SP_BLK_10a and SP_BLK_11a.

Each plane may include first to nth main blocks Main_BLK_1 to Main_BLK_n (n is a natural number of 1 or more). The zeroth plane Plane 0 may include the zeroth and first special blocks SP_BLK_00a and SP_BLK_01a. The main block may be a memory block for storing user data. The special block may be a memory block for storing special information required to initialize the memory device. The number of planes included in the memory device, the number of special blocks and main blocks, which are included in the plane, are not limited to this embodiment.

A result obtained by reading special information stored in special blocks may be output to a multi-bit check circuit through a page buffer Page Buffer coupled to each plane. The page buffer Page Buffer and the multi-bit circuit may be coupled to each other through an internal bus INT_BUS.

The multi-bit check circuit may detect data bits representing special information, using the multi-bit check scheme, from the read result provided thereto. Each of the data bits representing the special information may be repeatedly stored a preset number of times in any one special block among the at least two special blocks. The multi-bit check circuit may store the detected data bits representing the special information in a special information storage. The special information storage may include a latch circuit for storing data.

The memory controller 200 may control an operation of the memory device 100 by using the special information stored in the special information storage. The memory controller 200 may provide a set parameter command to the memory device 100 through an input/output pad IO PAD. The memory device 100 may change the special information stored in the special information storage in response to the set parameter command. The input/output pad IO PAD and the special information storage may be coupled to each other through a control bus CNTL_BUS.

Referring to a block diagram (b) in FIG. 6, A memory device 100 may perform an operation of merging special information stored in special blocks in response to block merge commands provided by the memory controller 200.

For example, the result obtained by reading the special information stored in the special blocks may be provided as an input of a read signal processing circuit through the internal bus INT_BUS coupled to the page buffer Page Buffer. The read signal processing circuit may provide the input result obtained by reading the special information as an input M_IN of a multi-bit check circuit.

The multi-bit check circuit may detect data bits representing special information, using the multi-bit check scheme, from the read result provided thereto. The multi-bit check circuit may provide the data bits representing the special information as an input of the read signal processing circuit.

The read signal processing circuit may store the data bits provided from the multi-bit check circuit in a special information storage in response to a special information read signal SP_EN. That is, an output M_OUT of the multi-bit check circuit may be provided as an input REG_IN of the special information storage. The special information read signal SP_EN may be an internal signal generated by the memory device in response to a special information read command.

Special information stored in at least two special blocks in this manner may be merged, and the merged special information may be stored in the special information storage. The memory device 100 may store the merged special information stored in the special information storage in one main block under the control of the memory controller 200. The merged special information may be information obtained by merging special information detected in the multi-bit check method among data read from the at least two special blocks.

In an embodiment, the merged special information stored in the special information storage may be transferred as an output of the special information storage to an input/output pad IO PAD through a control bus CNTL_BUS under the control of the memory controller 200. The merged special information transferred to the input/output pad IO PAD may be provided to the memory controller 200. In another embodiment, the merged special information stored in the special information storage may be transferred as an output of the special information storage to a page buffer Page Buffer coupled to the memory cell array through the internal bus INT_BUS under the control of the memory controller 200.

The memory device 100 may set one main block as a special block under the control of the memory controller 200. The memory device 100 may erase at least two special blocks, data in which are read under the control of the memory controller 200. The memory device 100 may set, as main blocks, the erased special blocks under the control of the memory controller 200.

After the operation of merging special information read from the special blocks is completed, main blocks may store the merged special information and then the main blocks may be set as new special blocks. Specifically, a special block SP_BLK_00b may be a main block to store special information merged from the special information stored in the special blocks SP_BLK_00a and SP_BLK_01a and then set as the special block SP_BLK_00b. A special block SP_BLK_10b may be a main block to store special information merged from the special information stored in the special blocks SP_BLK_10a and SP_BLK_11a and then set as the special block SP_BLK_10b.

Consequently, in the memory device 100, the number of special blocks decreases, and thus the time required to read special information stored in a special block can be reduced. In the memory device 100, the number of main blocks for storing user data can increase.

FIG. 7 is a circuit diagram illustrating operations of the memory controller 200 and the memory device 100 in accordance with an embodiment of the present disclosure.

Referring to FIG. 7, the memory device 100 may include the control signal generator 131, the special information merger 132, and the special information storage 133.

The control signal generator 131 receives a special information read command from a special information read controller 211 of the special block manager 210 in the memory controller 200. When the special information read command is input, the control signal generator 131 may generate a special information read signal and provide the generated special information read signal to the special information merger 132.

The control signal generator 131 may generate a special information output signal and provide the generated special information output signal to the special information storage 133, in response to the special information read command. The special information read command may be a command for requesting merged special information stored in the special information storage 133 to be provided to the memory controller 200.

The special information merger 132 may include a read signal processing circuit 132a and a multi-bit check circuit 132b. The read signal processing circuit 132a may sequentially read data stored in at least two special blocks, in response to the special information read signal provided by the control signal generator 131. The data stored in the at least two special blocks may be data representing plural pieces of special information.

For example, the read signal processing circuit 132a may sequentially receive, from the read/write circuit 123, results obtained by reading the data stored in the at least two special blocks. The read signal processing circuit 132a may provide the multi-bit check circuit 132b with a result obtained by reading data bits stored in the special blocks.

The multi-bit check circuit 132b may detect data bits representing special information, using the multi-bit check scheme, from the read result provided thereto. Each of the data bits representing the special information may be repeatedly stored a preset number of times in any one special block among the at least two special blocks. For example, the multi-bit check circuit 132b may detect, from the read result, the same data bits repeated a reference number or more of times as the data bits representing the special information. The multi-bit check circuit 132b may provide the detected data bits representing the special information to the read signal processing circuit 132a. The read signal processing circuit 132a may store the data bits provided from the multi-bit check circuit 132b to the special information storage 133.

The special information storage 133 may include a latch circuit for storing data. The special information storage 133 may store the data bits representing the special information, which are provided by the read signal processing circuit 132a. In an embodiment, the special information storage 133 may store merged special information. The merged special information may be information obtained by merging special information detected using the multi-bit check method among data read from the at least two special blocks.

In another embodiment, the merged special information stored in the special information storage 133 may be transferred as an output of the special information storage 133 to read/write circuit coupled to the memory cell array described with reference to FIG. 2 through an internal bus INT_BUS, under the control of a special block setter 212 of the special block manager 210 in the memory controller 200.

The special block manager 210 may include the special information read controller 211 and the special block setter 212.

Specifically, the special information read controller 211 may provide a special information read command to the control signal generator 131. The special information read command may be a command for requesting merged special information stored in the special information storage 133 to be provided to the special block manager 210.

The special block setter 212 may provide the special information storage 133 with a program command for storing the merged special information acquired according to the special information read command in one main block. The one main block may be a memory block for storing user data. The special block setter 212 may provide the memory device 100 with an erase command for at least two special blocks, data stored in which are read in response to the special information read command.

The special block setter 212 may change values of special information stored in the special information storage 133, using a set parameter command. The special block setter 212 may store, in one main block, the changed special information stored in the special information storage 133, using block merge commands.

The special block setter 212 may set, as a new special block, a main block in which special block information are stored. The special block setter 212 may set erased special blocks as main blocks. Specifically, the special block setter 212 may set the main block as a special block, or provide the memory device 100 with a special block setting command for setting the erased special blocks as main blocks.

FIG. 8 is a diagram illustrating the read signal processing circuit 132a shown in FIG. 7.

Referring to FIG. 8, a case where the memory device includes a first special block and a second special block is described.

Read operations of the first special block and the second special block may be sequentially performed in response to a special information read command input from the memory controller.

First, the read signal processing circuit 132a may receive a special information read signal SP_EN input from the control signal generator 131 described with reference to FIG. 7. The read signal processing circuit 132a may receive a data read result that is a result obtained by reading data stored in the first special block from the read/write circuit 123 described with reference to FIG. 7. When the special information read signal SP_EN is in a high state, the read signal processing circuit 132a may provide the data read result as an input M_IN of the multi-bit check circuit 132b described with reference to FIG. 6.

Subsequently, the multi-bit check circuit 132b may detect special information included in the data read result, using the multi-bit check scheme. For example, the multi-bit check circuit 132b may detect, from the data read result, the same data bits repeated a reference number or more of times as data bits representing the special information. The special information detected by the multi-bit check circuit 132b may be an output M_OUT of the multi-bit check circuit 132b.

The read signal processing circuit 132a may receive the output M_OUT of the multi-bit check circuit 132b from the multi-bit check circuit 132b. The read signal processing circuit 132a may provide the output M_OUT of the multi-bit check circuit 132b as an input REG_IN of the special information storage 133 described with reference to FIG. 7.

Subsequently, when data stored in the second special block is read, the read signal processing circuit 132a may receive a data read result that is a result obtained by reading the data stored in the second special block. When the special information read signal SP_EN is in the high state, the read signal processing circuit 132a may provide the data read result as the input M_IN of the multi-bit check circuit 132b.

Subsequently, the multi-bit check circuit 132b may detect special information included in the data read result, using the multi-bit check scheme. Data bits representing the special information detected by the multi-bit check circuit 132b may be the output M_OUT of the multi-bit check circuit 132b.

The read signal processing circuit 132a may receive the output M_OUT input from the multi-bit check circuit 132b. When the special information read signal SP_EN is in the high state, the read signal processing circuit 132a may provide the output M_OUT of the multi-bit check circuit 132b as the input REG_IN of the special information storage 133.

Through the above procedure, the special information stored in the first special block and the second special block may be stored in the special information storage 133.

When the special information read signal SP_EN is in a low state, the read signal processing circuit 132a may provide a result obtained by reading, by the read/write circuit 123, data stored in a special bock as the input REG_IN of the special information storage 133 without passing through the multi-bit check circuit 132b.

FIG. 9 is a diagram illustrating a special block merge operation.

Referring to FIG. 9, the memory device may include zeroth and first plane Plane 0 and Plane 1. Each plane may include at least one special block and a plurality of main blocks for user data. The special block may be a memory block for storing special information required to initialize the memory device. The number of special blocks and main blocks, which are included in the plane is not limited to this embodiment.

The zeroth plane Plane 0 of the memory device before the special block merge operation may include two special blocks SP_BLK_00a and SP_BLK_01a. The first plane Plane 1 of the memory device before the special block merge operation may include two special blocks SP_BLK_10a and SP_BLK_11a. Each of the zeroth and first plane Plane 0 and Plane 1 may include first to nth main blocks Main_BLK_1 to Main_BLK_n (n is a natural number of 1 or more).

Each special block included in the memory device may store special information. For example, the special information may include at least one of bad block information, column repair information, and logic information. The bad block information may represent initial bad memory blocks among the plurality of memory blocks included in the memory device. The column repair information may represent a bad column of the memory cell array. The logic information may represent a program bias, a read bias, an erase bias, and the like as conditions necessary for an operation of the memory device. The special information may be information acquired in each of a package test step and a wafer test step.

In an embodiment, the special block SP_BLK_00a may store bad block information acquired in the package test step. The special block SP_BLK_01a may store bad block information acquired in the wafer test step. The special block SP_BLK_10a may store column repair information acquired in the package test step. The special block SP_BLK_11a may store column repair information acquired in the wafer test step.

When the special block merge operation in accordance with the embodiment of the present disclosure is performed, data stored in at least two special blocks may be merged and stored in one special block. That is, data stored in at least two special blocks may be stored in one main block, and the main block may be set as a new special block. The at least two previous special blocks may be erased, and the erased special blocks may be set as main blocks in which user data is to be stored.

The bad block information acquired in the package test step, which is stored in the special block SP_BLK_00a, and the bad block information acquired in the wafer test step, which is stored in the special block SP_BLK_01a, may be merged and stored in a new special block SP_BLK_00b. In this manner, the column repair information acquired in the package test step, which is stored in the special block SP_BLK_10a, and the column repair information acquired in the wafer test step, which is stored in the special block SP_BLK_11a, may be merged and stored in a new special block SP_BLK_10b.

When the special block merge operation in accordance with the embodiment of the present disclosure is performed, data stored in at least two special blocks may be merged and stored in one special block. Thus, only one merged special block is read without reading data stored in a plurality of special blocks in a booting operation of the memory device, and thus, the speed of a booting operation or reset operation can be improved.

The zeroth plane Plane 0 of the memory device after the special block merge operation may include one special block SP_BLK_00b. The first plane Plane 1 of the memory device after the special block merge operation may include one special block SP_BLK_10b. Each of the zeroth and first planes Plane 0 to Plane 1 may include a zeroth main block Main_BLK_0 in addition to the first to nth main blocks. Thus, the memory device after the special block merge operation can additionally secure a main block for storing user data.

FIG. 10 is a diagram illustrating booting operations of the memory device before and after special block merge.

Referring to FIG. 10, the memory controller may provide a command for controlling the memory device, and data and an address, which are requested in a command operation of the memory device, through a DQ # pad.

The memory controller may determine which one of an active state (Busy) or inactive state (Ready) the memory device corresponds to through an RB # pad. The active state may be a state in which the memory device performs an operation corresponding to the command provided by the memory controller. The inactive state may be a state in which the memory device does not perform any operation. When a signal of the RB # pad represents logic value "high," the memory device may be in the inactive state. When the signal of the RB # pad represents logic value "low," the memory device may be in the active state.

The memory controller may provide the memory device with a reset command FFh for initializing the memory device in a booting operation of the memory device through the DQ # pad. The memory device may read special information stored in special blocks in response to the reset command FFh. The special information may be information required to initialize the memory device.

In FIG. 10, timing diagram (a) illustrates a booting operation of the memory device before a special block merge. The timing diagram (a) illustrates a booting operation of the memory device (a) described with reference FIG. 6.

At a first time t_a1, the memory controller may provide the reset command FFh to the memory device (a). The signal of the RB # pad represents the logic value "high," and the memory device (a) is in the inactive state.

At a second time t_a2, the memory device (a) may start an operation of reading special information stored in special blocks in response to the reset command FFh. Specifically, each of the four special blocks SP_BLK_00a, SP_BLK_01a, SP_BLK_10a, and SP_BLK_11a included in the memory device (a) may be read. The signal of the RB # pad is changed from the logic value "high" to the logic value "low." That is, the memory device (a) is changed from the inactive state to the active state.

At a third time t_a3, the memory device (a) may complete the operation of reading the special information stored in the special blocks. The signal of the RB # pad is changed from the logic value "low" to the logic value "high." The memory device (a) is changed from the active state to the inactive state.

The time tR1 required to read the special information stored in the special blocks of the memory device (a) may be a time difference between the second time t_a2 and the third time t_a3.

In FIG. 10, timing diagram (b) illustrates a booting operation of the memory device after the special block merge. The timing diagram (b) illustrates a booting operation of the memory device (b) described with reference to FIG. 6.

At a first time t_b1, the memory controller may provide block merge commands xx1h to xxnh (n is a natural number of 1 or more) to the memory device. The signal of the RB # pad represents the logic value "high," and the memory device (b) is in the inactive state. The block merge commands xx1h to xxnh may include a special information read command, a program command, an erase command, a special block setting command, and a set parameter command.

The memory controller may provide a special information read command to the memory device (b). The special information read command may be a command separately defined to request a result obtained by reading data stored in at least two special blocks. In an embodiment, the special information read command may be a command for requesting data stored in at least two special blocks to be read and then stored in the special information storage 133 described with reference to FIG. 7.

The memory controller may acquire special information stored in the at least two special blocks, which are read by the memory device (b), in response to the special information read command Specifically, the memory controller may acquire merged special information stored in the special information storage 133.

The memory controller may change values of the special information stored in the special information storage 133, using a set parameter command.

The memory controller may provide the memory device (b) with a program command for storing the acquired special information in one memory block. The memory device (b) may store the special information acquired by the memory controller in one memory block in response to the program command.

The memory controller may provide the memory device (b) with an erase command for erasing at least two special blocks, data in which are read by the memory device (b). The memory device (b) may erase the at least two special blocks in response to the erase command.

The memory controller may provide the memory device (b) with a special block setting command for setting the memory block in which the acquired special bock is stored as a new special block. The memory controller may provide the memory device (b) with a separate special block setting command for setting at least two erased special blocks as main blocks. The main block may be a memory block for storing user data.

A second time t_b2 may be a time after a special block merge operation of the memory device (b) is completed, in response to the block merge commands (CMDs) provided to the memory device (b) at the first time t_b1. Specifically, the special block SP_BLK_00b may store special information in the form in which the special information stored in the special blocks SP_BLK_00a and SP_BLK_01a are merged. The special block SP_BLK_10b may store special information in the form in which the special information stored in the special blocks SP_BLK_10a and SP_BLK_11a are merged.

At the second time t_b2, the memory controller may provide the reset command FFh to the memory device (b).

At a third time t_b3, the memory device (b) may start an operation of reading the merged special information stored in the special blocks in response to the reset command FFh. Specifically, each of the two special blocks SP_BLK_00b and SP_BLK_10b included in the memory device (b) may be read. The signal of the RB # pad is changed from the logic value "high" to the logic value "low," and the memory device (b) is in the active state.

At a fourth time t_b4, the memory device (b) may complete the operation of reading the merged special information stored in the special blocks.

The time tR2 required to read the merged special information stored in the special blocks may be a time difference between the third time t_b3 and the fourth time t_b4.

As compared with the memory device (a), the time required to read the special information of the memory device (b) can be reduced by the difference between tR1 and tR2. In other words, only one merged special block is read without reading data stored in a plurality of special blocks in the booting operation of the memory device, so that the speed of a booting operation or reset operation can be improved. Thus, the time required to perform a booting operation or reset operation can be reduced by the difference between the time tR1 required to read the special information stored in the plurality of special blocks and the time tR2 required to read the special information stored in the merged special block.

FIG. 11 is a flowchart illustrating an operation of the memory controller.

Referring to FIG. 11, in step S1101, the memory controller may provide a special information read command to the memory device. The special information read command may be a command for requesting data stored in at least two special blocks to be read and then stored in the special information storage.

In step S1103, the memory controller may read merged special information stored in the special information storage. The merged special information may be information obtained by merging special information stored in at least two special blocks, which are read in response to the special information read command.

In step S1105, the memory controller may store the read merged special information in a main block for storing user data, and set the main block as a new special block. The memory controller may provide the memory device with a program command for storing the read merged special information in the main block.

In step S1107, after the at least two special blocks having data which are read in response to the special information read command are erased, the erased special blocks may be set as main blocks.

FIG. 12 is a flowchart illustrating an operation of the memory device.

Referring to FIG. 12, in step S1201, the memory device may receive a special information read command from the memory controller. The memory device may sequentially read data bits representing special information stored in at least two special blocks, in response to the special information read command.

In step S1203, the memory device may detect data bits representing special information among the read data bits, using the multi-bit check scheme.

In step S1205, the memory device may store the detected data bits representing the special information in the special information storage. The data bits representing the special information stored in the at least two special blocks may be merged and stored in the special information storage.

In step S1207, the memory device may output data stored in the special information storage to the memory controller through the data input/output circuit. The data stored in the special information storage may be data obtained by merging data representing special information detected using the multi-bit check scheme among data read from the at least two special blocks.

FIG. 13 is a diagram illustrating another embodiment of the memory controller shown in FIG. 1.

Referring to FIG. 13, a memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory, or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to be translated into a PBA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored in the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

FIG. 14 is a block diagram illustrating a memory card system to which the storage device is applied in accordance with an embodiment of the present disclosure.

Referring to FIG. 14, the memory card system 2000 includes a memory controller 2100, a memory device, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory controller 2100 may be implemented identically to the memory controller 200 described with reference to FIG. 1.

In an example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), Multi-Media Card (MMC) an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

FIG. 15 is a block diagram exemplarily illustrating a Solid State Drive (SSD) system to which the storage device is applied in accordance with an embodiment of the present disclosure.

Referring to FIG. 15, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), Multi-Media Card (MMC) an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

FIG. 16 is a block diagram illustrating a user system to which the storage device is applied in accordance with an embodiment of the present disclosure.

Referring to FIG. 16, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or volatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIG. 1. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a motor.

In accordance with the present disclosure, there can be provided a storage device having an improved booting speed and an operating method thereof.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
a memory cell array including a plurality of memory blocks; and
a control logic configured to read special information on setting the memory device from at least two special blocks among the plurality of memory blocks using a multi-bit check scheme and store the read special information as a form of merged special information in a selected memory block among the plurality of memory blocks,
wherein the control logic comprises:
a control signal generator configured to generate a special information read signal for reading plural pieces of the special information stored in the at least two special blocks in response to a special information read command from a memory controller;
a special information merger configured to read the plural pieces of special information in response to the special information read signal; and
a special information storage configured to store the read plural pieces of special information as the merged special information.

2. The memory device of claim 1, wherein the control signal generator further provides the special information storage with a special information output signal for requesting the merged special information to be provided to the memory controller, in response to the special information read command.

3. The memory device of claim 1,
wherein the control logic sets the at least two special blocks as user blocks after the merged special information is stored in the selected memory block.

4. The memory device of claim 1, wherein the special information merger reads the plural pieces of special information by reading data stored in the at least two special blocks and detects data representing the plural pieces of special information among the read data.

5. The memory device of claim 4, wherein the at least two special blocks repeatedly store, a preset number of times, each data bit representing at least one piece of special information among the plural pieces of special information.

6. The memory device of claim 5,
wherein the special information merger includes:
a read signal processing circuit configured to read data bits from the at least two special blocks; and
a multi-bit check circuit configured to detect the data bits representing the at least one piece of special information among the read data bits, using the multi-bit check scheme, and
wherein the special information storage stores the detected data bits.

7. The memory device of claim 6, wherein the multi-bit check circuit detects the data bits that are repeated a reference number of times or more among the read data bits.

8. The memory device of claim 1, wherein the plural pieces of special information are information required to initialize or set the memory device.

9. The memory device of claim 8, wherein the plural pieces of special information include at least one of bad block information representing a bad block of the memory device, column repair information representing a bad column of the memory device, and logic information representing an operating condition of the memory device.

10. A memory controller for controlling a memory device including a plurality of memory blocks, the memory controller comprising:
a special information read controller configured to generate a special information read command for reading plural pieces of special information stored in at least two special blocks among the plurality of memory blocks by using a multi-bit check scheme and provide the special information read command to the memory device; and a special block setter configured to control the memory device to store the plural pieces of special information as a form of merged special information in a selected memory block, and control the memory device to set the selected memory block as a new special block, wherein the plural pieces of special information are information required to initialize or set the memory device and are stored as the merged special information in a register of the memory device according to the special information read command before the merged special information is stored in the selected memory block.

11. The memory controller of claim 10, wherein the plural pieces of special information include at least one of bad block information representing a bad block of the memory device, column repair information representing a bad column of the memory device, and logic information representing an operating condition of the memory device.

12. The memory controller of claim 10, wherein the special block setter provides the memory device with an erase command for the at least two special blocks.

13. The memory controller of claim 12,
wherein the special block setter sets the at least two special blocks erased according to the erase command as main blocks for storing user data.

14. A storage device comprising:
a memory device including a plurality of memory blocks; and
a memory controller configured to provide the memory device with a special information read command for reading plural pieces of special information stored in at least two special blocks among the plurality of memory blocks, and provide the memory device with a program command for storing merged special information acquired from the memory device according to the special information read command, in a selected memory block,
wherein the memory device is configured to read data stored in the at least two special blocks and store the plural pieces of special information detected using a multi-bit check scheme among the read data, as the merged special information and provide the merged special information to the memory controller, in response to the special information read command, and
wherein the plural pieces of special information are required to initialize the memory device.

15. The storage device of claim 14, wherein any one special block among the at least two special blocks repeatedly stores, a preset number of times, each data bit representing at least one piece of special information among the plural pieces of special information.

16. The storage device of claim 14,
wherein the memory controller provides the memory device with a special block setting command for setting the selected memory block as a new special block, and
wherein the selected memory block is a memory block configured to store user data among the plurality of memory blocks.

17. A method for operating a memory controller for controlling a memory device including a plurality of memory blocks, the method comprising:
providing the memory device with a special information read command for reading plural pieces of special information stored in at least two special blocks by using a multi-bit check scheme among the plurality of memory blocks;
acquiring merged special information generated based on the plural pieces of special information according to the special information read command from the memory device;
providing the memory device with a program command for storing the merged special information in a selected memory block; and
providing the memory device with a special block setting command for setting the selected memory block as a new special block.

18. The method of claim 17, wherein the plural pieces of special information include at least one of bad block information representing a bad block of the memory device, column repair information representing a bad column of the memory device, and logic information representing an operating condition of the memory device.

19. The method of claim 18, further comprising:
providing the memory device with an erase command for the at least two special blocks; and
providing the memory device with the special block setting command for setting the erased at least two special blocks as main blocks.

20. An operating method of a memory device including a plurality of memory blocks, the method comprising:
reading first and second special information respectively stored in first and second special blocks using a multi-bit check scheme;
merging the first and second special information in a register of the memory device;
storing the merged special information from the register in a free main block;
setting the free main block as a special block; and
erasing the first and second special blocks;
setting the first and second special blocks as main blocks,
wherein the first and second special information is required to initialize or set the memory device.

* * * * *